United States Patent
Wang et al.

(10) Patent No.: US 10,519,306 B2
(45) Date of Patent: *Dec. 31, 2019

(54) SOFT POLYPROPYLENE COMPOSITION

(71) Applicant: BOREALIS AG, Vienna (AT)

(72) Inventors: Jingbo Wang, Engerwitzdorf (AT); Antonios Gitsas, Linz (AT); Pauli Leskinen, Helsinki (FI); Johanna Lilja, Porvoo (FI); Martina Sandholzer, Linz (AT); Markus Gahleitner, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/095,599

(22) PCT Filed: May 16, 2017

(86) PCT No.: PCT/EP2017/061647
§ 371 (c)(1),
(2) Date: Oct. 22, 2018

(87) PCT Pub. No.: WO2017/198633
PCT Pub. Date: Nov. 23, 2017

(65) Prior Publication Data
US 2019/0127565 A1  May 2, 2019

(30) Foreign Application Priority Data
May 18, 2016  (EP) ..................... 16170186

(51) Int. Cl.
C08L 23/16 (2006.01)
H01B 3/44 (2006.01)
C08L 23/14 (2006.01)
C08J 5/18 (2006.01)

(52) U.S. Cl.
CPC ............... *C08L 23/16* (2013.01); *C08J 5/18* (2013.01); *C08L 23/142* (2013.01); *H01B 3/441* (2013.01); *C08J 2323/16* (2013.01); *C08J 2423/16* (2013.01); *C08L 2203/16* (2013.01); *C08L 2203/202* (2013.01); *C08L 2205/02* (2013.01); *C08L 2207/02* (2013.01); *C08L 2308/00* (2013.01); *C08L 2314/02* (2013.01)

(58) Field of Classification Search
CPC . C08K 3/34; C08L 23/16; C08L 23/12; C08L 2207/02; C08L 23/142; C08L 2203/16; C08L 2203/202; C08L 2205/02; C08L 2308/00; C08L 2314/02; C08F 210/06; C08F 4/6465; C08F 2/001; C08F 2500/17; C08F 210/16; C08F 2500/12; C08F 4/6192; C08F 4/651; C08F 2500/26; B01B 3/441; C08J 5/18; C08J 2423/16; C08J 2323/16
See application file for complete search history.

(56) References Cited

U.S. PATENT DOCUMENTS 10,100,185 B2 * 10/2018 Wang et al. .......... C08F 210/06
2014/0249264 A1 * 9/2014 Ydens et al. .......... C08L 23/12
524/528

FOREIGN PATENT DOCUMENTS

| EP | 0887379 | 12/1998 |
|---|---|---|
| EP | 1211289 | 6/2002 |
| EP | 2471858 | 7/2012 |
| EP | 2415790 | 8/2012 |
| EP | 2610270 | 8/2012 |
| EP | 2610271 | 7/2013 |
| EP | 2610272 | 7/2013 |
| WO | 92/12182 | 12/1991 |
| WO | 99/24478 | 5/1999 |
| WO | 99/24479 | 11/1999 |
| WO | 00/68315 | 5/2000 |
| WO | 2004/000899 | 6/2002 |
| WO | 2004/111095 | 12/2004 |
| WO | 2012007430 | 7/2011 |
| WO | 2013010852 | 1/2013 |
| WO | 2013092620 | 6/2013 |
| WO | 2015117948 | 8/2015 |

OTHER PUBLICATIONS

Busico, et al., "Alk-1-ene Polymerization in the Presence of a Monocyclopentadienyl Zirconium(iv) Acetamidinate Catalyst: Microstructural and Mechanistic Insightsa," Macromolecular Journals, 2007, vol. 28, pp. 1128-1134, Wiley-VCH Verlag GmbH & Co. KGaA, Weinheim.

Cheng, H.N., "C NMR Analysis of Ethylene-Propylene Rubbers," Macromolecules, 1984, vol. 17, No. 10, pp. 1950-1955, American Chemical Society.

International Search Report and Written Opinion for Application No. PCT/EP2017/061647, dated Jun. 30, 2017, 13 pgs.

Resconi, et al., "Selectivity in Propene Polymerization with Metallocene Catalysts," Chemical Reviews, 2000, vol. 100, pp. 1253-1345, American Chemical Society.

Wang, et al., "Structural Analysis of Ethylene/Propylene Copolymers Synthesized with a Constrained Geometry Catalyst," Macromolecules, 2000, vol. 33, pp. 1157-1162, American Chemical Society.

Zhou, et al., "A new decoupling method for accurate quantification of polyethylene copolymer composition and triad sequence distribution with 13C NMR," Journal of Magnetic Resonance, 2007, vol. 187, pp. 225-233, Elsevier.

Kakugo, et al., "C NMR Determination of Monomer Sequence Distribution in Ethylene-Propylene Copolymers Prepared with s-TiCL13-AL (C2H5)2C1," Macromolecules, vol. 15, 1982, pp. 1150-1152, American Chemical Society.

(Continued)

*Primary Examiner* — Nathan M Nutter

(74) *Attorney, Agent, or Firm* — Lowenstein Sandler LLP

(57) ABSTRACT

The present invention is directed to a new heterophasic propylene copolymer (RAHECO), a process for obtaining said heterophasic propylene copolymer (RAHECO) and a film or a cable insulation comprising the heterophasic propylene copolymer (RAHECO).

17 Claims, 1 Drawing Sheet

(56) References Cited

OTHER PUBLICATIONS

Singh, et al., Triad Sequence Determination of Ethylene-Propylene Copolymers—Application of Quantitative 13C NMR, Polymer Testing, 29, 2009, pp. 475-479.

* cited by examiner

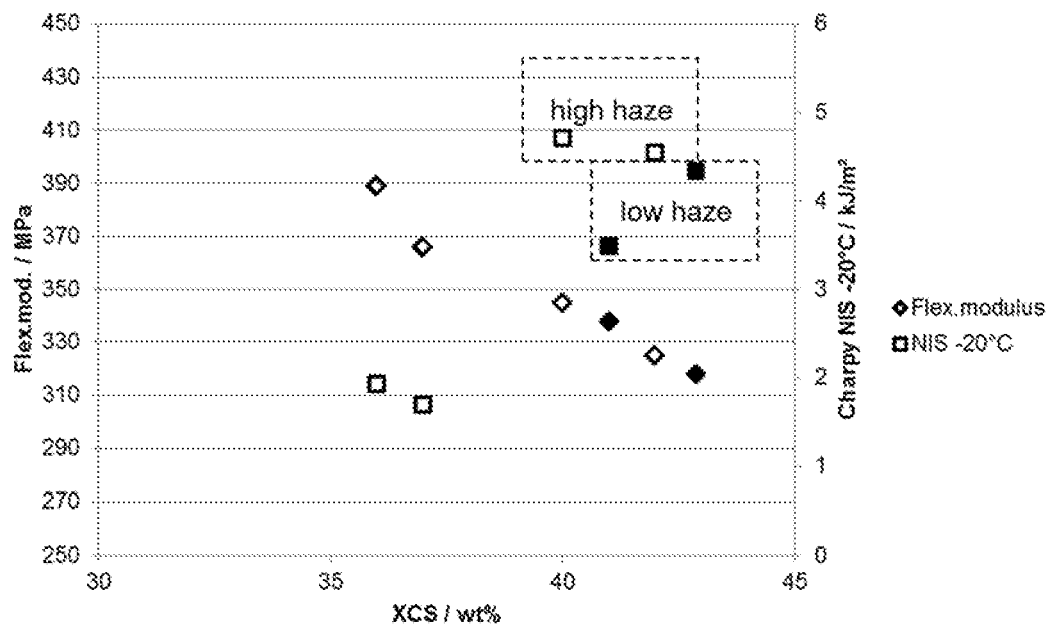
Effect of XCS content on flexural modulus and low-temperature impact strength

SOFT POLYPROPYLENE COMPOSITION

CROSS-REFERENCE TO RELATED APPLICATIONS

This application is a national phase entry under 35 U.S.C. § 371 of International Application No. PCT/EP2017/061647, filed on May 16, 2017, which claims the benefit of priority of European Patent Application No. 16170186.7, filed on May 18, 2016. The contents of these applications are hereby incorporated by reference herein in their entirety.

SUMMARY

The present invention is directed to a new heterophasic propylene copolymer (RAHECO), a process for obtaining said heterophasic propylene copolymer (RAHECO) and a film as well as a cable insulation comprising the heterophasic propylene copolymer (RAHECO).

There is an increasing trend in the medical packaging industry to use polyolefin materials such as polypropylene films. For medical applications, the polymer should impart sufficient stiffness as well as high impact strength to the final packaging material wherein softness rather than stiffness is a key requirement. Of course also these medical products must be sterilizable.

It is known that impact strength of polypropylene can be improved by dispersing a rubber phase within the polymer matrix, thereby obtaining a heterophasic polypropylene composition. In particular, heterophasic propylene polymers (impact-modified propylene polymers) provide high impact strength if the amount of rubber dispersed within the matrix is sufficiently high, e.g. at least 10.0 wt.-% or even at least 15.0 wt.-%.

In the field of medical packaging, soft materials with good optical properties in combination with good mechanical properties are required. However, it has turned out that the properties of standard heterophasic systems change significantly after sterilization treatment which is an essential requirement for medical applications. Typically, the optical properties such as haze as well as the mechanical properties such as softness are undesirable impaired.

It was found that random heterophasic propylene copolymers (RAHECOs) are a generally suitable class of soft base polymers applicable for cast and blown film applications. Random heterophasic propylene copolymers (RAHECOs) are characterized by a very low flexural modulus. However, the existing random heterophasic propylene copolymers (RAHECOs) applicable for film applications are prepared in the presence of catalysts comprising phthalic acid esters as internal donors. As in the medical area REACH compliance is of special importance, the application of health and environmentally harmful compounds such as phthalic acid esters should be avoided.

Therefore, it is an object of the present invention to provide a random heterophasic propylene copolymer (RAHECO) applicable for film applications which is free of phthalic acid ester derivatives and shows improved optical and mechanical properties before and after sterilization.

The finding of the present invention is to provide a random heterophasic propylene copolymer (RAHECO) wherein the elastomeric propylene copolymer (E) dispersed in the matrix (M) of the heterophasic copolymer has a rather low comonomer content and a specific relative content of isolated to block ethylene sequences. Further, the finding of the present invention is that the random heterophasic propylene copolymer (RAHECO) must be produced in the presence of a Ziegler-Natta catalyst containing an internal donor (D) not belonging to the class of phthalic acid ester derivatives. A random heterophasic propylene copolymer (RAHECO) fulfilling the requirements as outlined above shows an improved balance between optical and mechanical properties before and after sterilization.

Accordingly, the present invention is directed to a heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M), wherein the heterophasic propylene copolymer (RAHECO) has a) a melt flow rate $MFR_2$ (230° C./2.16 kg) measured according to ISO 1133 in the range of 2.5 to 12.0 g/10 min, b) a xylene cold soluble fraction (XCS) determined according ISO 16152 (25° C.) in the range of 38.0 to 50.0 wt.-%, said xylene cold soluble fraction (XCS) having a comonomer content below 36.0 mol-%, and wherein further the xylene cold insoluble fraction (XCI) of the heterophasic propylene copolymer (RAHECO) has a relative content of isolated to block ethylene sequences (I(E)) of below 55.0%, wherein the I(E) content is defined by equation (I)

$$I(E) = \frac{fPEP}{(fEEE + fPEE + fPEP)} \times 100 \quad (I)$$

wherein

I(E) is the relative content of isolated to block ethylene sequences [in %];

fPEP is the mol fraction of propylene/ethylene/propylene sequences (PEP) in the xylene cold insoluble fraction (XCI) of the heterophasic propylene copolymer (RAHECO);

fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RAHECO);

fEEE is the mol fraction of ethylene/ethylene/ethylene sequences (EEE) in the xylene cold insoluble fraction (XCI) of the heterophasic propylene copolymer (RAHECO), wherein all sequence concentrations being based on a statistical triad analysis of $^{13}$C-NMR data.

It has surprisingly been found out that such heterophasic propylene copolymer (RAHECO) is a soft polypropylene having improved mechanical properties while the optical properties are kept on a high level before and after sterilization. The inventive heterophasic propylene copolymer (RAHECO) is applicable for the preparation of films for medical packaging as well as cable insulations.

In one embodiment of the present invention, the heterophasic propylene copolymer (RAHECO) is free of phthalic acid esters as well as their respective decomposition products.

In another embodiment of the present invention, the xylene cold soluble fraction (XCS) of the heterophasic propylene copolymer (RAHECO) has an intrinsic viscosity (IV) determined according to DIN ISO 162/1 (in Decalin at 135° C.) in the range of 1.8 to 3.5 dl/g.

In one embodiment of the present invention, the random propylene copolymer (R-PP) has i) before vis-breaking a melt flow rate $MFR_2$ (230° C./2.16 kg) measured according to ISO 1133 in the range of 1.0 to 4.0 g/10 min, and/or ii) a comonomer content in the range of 5.1 to 17.0 mol-%.

In a further embodiment of the present invention, the random propylene copolymer (R-PP) comprises a first propylene copolymer fraction (R-PP1) and a second propylene copolymer fraction (R-PP2) and the comonomer contents of the random propylene copolymer (R-PP) and the first propylene copolymer fraction (R-PP1) fulfil inequation (III), $$\frac{Co(RPP)}{Co(RPP1)} \geq 2.0, \qquad (III)$$

wherein Co(RPP) is the comonomer content of the random propylene copolymer (R-PP) and Co(RPP1) is the comonomer content of the first propylene copolymer fraction (R-PP1).

In another embodiment of the present invention, the heterophasic propylene copolymer (RAHECO) comprises 60.0 to 85.0 wt.-%, based on the total weight of the heterophasic propylene copolymer (RAHECO), of the random propylene copolymer (R-PP) and 15.0 to 40.0 wt.-%, based on the total weight of the heterophasic propylene copolymer (RAHECO), of the elastomeric propylene copolymer (E).

In still another embodiment of the present invention, the comonomers of the random propylene copolymer (R-PP) and/or the comonomers of the elastomeric propylene copolymer (E) are ethylene and/or $C_4$ to $C_8$ α-olefins.

In a further embodiment of the present invention, the heterophasic propylene copolymer (RAHECO) has been visbroken.

Preferably, the heterophasic propylene copolymer (RAHECO) has been visbroken with a visbreaking ratio (VR) as defined by in-equation (II)

$$1.1 \leq \frac{MFRfinal - MFRinitial}{MFRinitial} \leq 10.0 \qquad (II)$$

wherein

"MFRfinal" is the $MFR_2$ (230° C./2.16 kg) of the heterophasic propylene copolymer (RAHECO) after visbreaking and "MFRinitial" is the $MFR_2$ (230° C./2.16 kg) of the heterophasic propylene copolymer (RAHECO) before visbreaking.

In one embodiment of the present invention, the heterophasic propylene copolymer (RAHECO) has a flexural modulus measured according to ISO 178 on injection molded specimen below 500 MPa.

In one embodiment of the present invention, the heterophasic propylene copolymer the heterophasic propylene copolymer (RAHECO) has i) a haze according to ASTM D 1003-00 measured on a 1 mm thick injection molded specimen below 80.0%, preferably below 78.0% and/or ii) a haze before sterilization determined according to ASTM D 1003-00 measured on a 50 µm cast film of below 15.0%, preferably of below 12.0%, and/or iii) a haze after sterilization determined according to ASTM D 1003-00 measured on a 50 µm cast film of below 20.0% preferably of below 16.0%.

In another embodiment of the present invention, the heterophasic propylene copolymer (RAHECO) has a melting temperature Tm of at least 140° C.

The present invention is further directed to a polymerization process for producing the heterophasic propylene copolymer (RAHECO), comprising the steps of a) polymerizing in a first reactor (R1) propylene and ethylene and/or a $C_4$ to $C_8$ α-olefin, obtaining a first random propylene copolymer fraction (R-PP1), b) transferring the first random propylene copolymer fraction (R-PP1) into a second reactor (R2), c) polymerizing in said second reactor (R2) in the presence of the first random propylene copolymer fraction (R-PP1) propylene and ethylene and/or a $C_4$ to $C_8$ α-olefin, obtaining a second random copolymer fraction (R-PP2), said first random propylene copolymer fraction (R-PP1) and said second random copolymer fraction (R-PP2) forming the random propylene copolymer (R-PP), d) transferring said random propylene copolymer (R-PP) into a third reactor (R3), e) polymerizing in said third reactor (R3) in the presence of the random propylene copolymer (R-PP) propylene and/or a $C_4$ to $C_8$ α-olefin, obtaining a third polymer fraction, said polymer fraction is the elastomeric copolymer (E), said propylene copolymer (R-PP) and said elastomeric propylene copolymer (E) form the heterophasic propylene copolymer (RAHECO).

In one embodiment of the present invention, the first random propylene copolymer fraction (R-PP1), the random propylene copolymer (R-PP) and the elastomeric copolymer (E) have been polymerized in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;

b) optionally a co-catalyst (Co), and c) optionally an external donor (ED).

Preferably, the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate and the molar-ratio of co-catalyst (Co) to external donor (ED) [Co/ED] is 5 to 45.

The present invention is further directed to a film comprising the heterophasic propylene copolymer (RAHECO).

The present invention is also directed to cable insulations comprising the heterophasic propylene copolymer (RAHECO).

BRIEF DESCRIPTION OF THE DRAWINGS

The FIGURE illustrates the effect of xylene cold soluble fraction (XCS) content on the flexural modulus and low-temperature impact strength.

DETAILED DESCRIPTION

In the following, the present invention is described in more detail.

The heterophasic propylene copolymer (RAHECO) according to the present invention is especially featured by its specific mechanical and optical properties.

Accordingly, it is preferred that the heterophasic propylene copolymer (RAHECO) has a flexural modulus measured according to ISO 178 below 500 MPa. For example, the heterophasic propylene copolymer (RAHECO) has a flexural modulus measured according to ISO 178 in the range of 200 to 400 MPa or in the range of 250 to 360 MPa.

Further, the inventive heterophasic propylene copolymer (RAHECO) features an improved toughness. Therefore, the inventive heterophasic propylene copolymer (RAHECO) preferably features a Charpy notched impact strength measured according to ISO 179-1eA:2000 at 23° C. in the range of 10.0 to 100.0 kJ/m$^2$, more preferably in the range of 20.0 to 90.0 kJ/m$^2$. Preferably, the heterophasic propylene copolymer (RAHECO) features a Charpy notched impact strength measured according to ISO 179-1eA:2000 at −20° C. in the range of 2.0 to 20.0 kJ/m$^2$, more preferably in the range of 2.5 to 10.0 kJ/m$^2$.

With regard to the optical properties it is preferred that the heterophasic propylene copolymer (RAHECO) has a haze according to ASTM D 1003-00 measured on a 1 mm thick injection molded specimen below 80.0%, preferably below 78.0%.

Additionally or alternatively, the heterophasic propylene copolymer (RAHECO) has a haze before sterilization determined according to ASTM D 1003-00 measured on a 50 μm cast film of below 15.0%, preferably of below 12.0%, and/or a haze after sterilization determined according to ASTM D 1003-00 measured on a 50 μm cast film of below 20.0% preferably of below 16.0%.

Preferably not only the heterophasic propylene copolymer (RAHECO) is featured by the specific values of toughness, flexural modulus and haze, but also the film comprising the heterophasic propylene copolymer (RAHECO) when measured under the same conditions as indicated above. Accordingly, the above indicated values of toughness, flexural modulus and haze are equally but proportionally applicable for the injection molded article and thin wall packaging.

The heterophasic propylene copolymer (RAHECO) according to this invention comprises a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (RAHECO). The presence of second phases or the so called inclusions are for instance visible by high resolution microscopy, like electron microscopy or atomic force microscopy, or by dynamic mechanical thermal analysis (DMTA).

Preferably, the heterophasic propylene copolymer (RAHECO) according to this invention comprises as polymer components only the random propylene copolymer (R-PP) and the elastomeric propylene copolymer (E). In other words, the heterophasic propylene copolymer (RAHECO) may contain further additives but no other polymer in an amount exceeding 5.0 wt.-%, more preferably exceeding 3.0 wt.-%, like exceeding 1.0 wt.-%, based on the total heterophasic propylene copolymer (RAHECO). One additional polymer which may be present in such low amounts is a polyethylene which is a by-reaction product obtained by the preparation of the heterophasic propylene copolymer (RAHECO). Accordingly, it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

The heterophasic propylene copolymer (RAHECO) has a melt flow rate MFR$_2$ (230° C./2.16 kg) in the range of 2.5 to 12.0 g/10 min, preferably in the range of 3.0 to 10.0 g/10 min, more preferably in the range of 3.5 to 8.0 g/10 min, still more preferably in the range of 3.5 to 7.0 g/10 min.

Preferably, it is desired that the heterophasic propylene copolymer (RAHECO) is thermo mechanically stable. Accordingly, it is appreciated that the heterophasic propylene copolymer (RAHECO) has a melting temperature of at least 140° C., more preferably in the range of 140 to 155° C., still more preferably in the range of 142 to 152° C.

Typically, the heterophasic propylene copolymer (RAHECO) has a rather low crystallization temperature, i.e. of not more than 120° C., more preferably in the range of 95 to 120° C., still more preferably in the range of 100 to 118° C. These values are especially applicable in case the heterophasic propylene copolymer (RAHECO) is not α-nucleated.

The heterophasic propylene copolymer (RAHECO) comprises apart from propylene also comonomers. Preferably the heterophasic propylene copolymer (RAHECO) comprises apart from propylene ethylene and/or C$_4$ to C$_8$ α-olefins. Accordingly, the term "propylene copolymer" according to this invention is understood as a polypropylene comprising, preferably consisting of, units derivable from
(a) propylene
and
(b) ethylene and/or C$_4$ to C$_8$ α-olefins.

Thus, the heterophasic propylene copolymer (RAHECO), i.e. the random propylene copolymer (R-PP) as well as the elastomeric propylene copolymer (E), comprises monomers copolymerizable with propylene, for example comonomers such as ethylene and/or C$_4$ to C$_8$ α-olefins, in particular ethylene and/or C$_4$ to C$_8$ α-olefins, e.g. 1-butene and/or 1-hexene. Preferably, the heterophasic propylene copolymer (RAHECO) according to this invention comprises, especially consists of, monomers copolymerizable with propylene from the group consisting of ethylene, 1-butene and 1-hexene. More specifically, the heterophasic propylene copolymer (RAHECO) of this invention comprises—apart from propylene—units derivable from ethylene and/or 1-butene. In a preferred embodiment, the heterophasic propylene copolymer (RAHECO) according to this invention comprises units derivable from ethylene and propylene only. Still more preferably the random propylene copolymer (R-PP) as well as the elastomeric propylene copolymer (E) of the heterophasic propylene copolymer (RAHECO) contain the same comonomer, like ethylene.

Accordingly, the elastomeric propylene copolymer (E) is preferably an ethylene propylene rubber (EPR), whereas the random propylene copolymer (R-PP) is a random ethylene propylene copolymer (R-PP).

Additionally, it is appreciated that the heterophasic propylene copolymer (RAHECO) preferably has a moderate total comonomer content which contributes to the softness of the material. Thus, it is required that the comonomer content of the heterophasic propylene copolymer (RAHECO) is in the range from 12.5 to 22.0 mol-%, preferably in the range from 13.9 to 21.0 mol-%, more preferably in the range from 14.0 to 20.0 mol-%, yet more preferably in the range from 14.3 to 20.0 mol-%.

The xylene cold soluble (XCS) fraction measured according to according ISO 16152 (25° C.) of the heterophasic propylene copolymer (RAHECO) is in the range from 38.0 to 50.0 wt-%, preferably in the range from 38.0 to 45.0 wt.-%, more preferably in the range from 39.0 to 44.0 wt.-%, still more preferably in the range from 40.0 to 43.5 wt.-%.

Further it is appreciated that the xylene cold soluble (XCS) fraction of the heterophasic propylene copolymer (RAHECO) is specified by its intrinsic viscosity. A low intrinsic viscosity (IV) value reflects a low weight average molecular weight. For the present invention it is appreciated that the xylene cold soluble fraction (XCS) of the heterophasic propylene copolymer (RAHECO) has an intrinsic viscosity (IV) measured according to ISO 1628/1 (at 135° C. in decalin) in the range of 1.8 to 3.5 dl/g, preferably in the range of 1.9 to 3.0 dl/g, more preferably in the range of 2.0 to below 2.8 dl/g, and most preferably in the range of 2.0 to below 2.6 dl/g.

Additionally, the comonomer content, preferably the ethylene content, of the xylene cold soluble (XCS) fraction of the heterophasic propylene copolymer (RAHECO) is below 36.0 mol.-%, more preferably in the range of 28.0 to below 35.5 mol.-%, still more preferably in the range of 30.0 to below 34.5 mol.-%. The comonomers present in the xylene cold soluble (XCS) fraction are those defined above for the random propylene copolymer (R-PP) and the elastomeric propylene copolymer (E), respectively. In one preferred embodiment the comonomer is ethylene only.

The heterophasic propylene copolymer (RAHECO) can be further defined by its individual components, i.e. the random propylene copolymer (R-PP) and the elastomeric propylene copolymer (E).

The random propylene copolymer (R-PP) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

As mentioned above the random propylene copolymer (R-PP) is featured by a moderate comonomer content. Accordingly, the comonomer content of the random propylene copolymer (R-PP) is in the range of 5.1 to 17.0 mol.-%, more preferably in the range of 5.4 to 10.5 mol.-%, yet more preferably in the range of 5.7 to 10.0 mol.-%, still more preferably in the range of 6.0 to 9.8 mol.-%.

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The random propylene copolymer (R-PP) preferably comprises at least two polymer fractions, like two or three polymer fractions, all of them are propylene copolymers. Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

Concerning the comonomers used for the first propylene copolymer fraction (R-PP1) and second propylene copolymer fraction (R-PP2) reference is made to the comonomers of the random propylene copolymer (R-PP). Preferably the first propylene copolymer fraction (R-PP1) and the second propylene copolymer fraction (R-PP2) contain the same comonomers, like ethylene.

It is preferred that the random propylene copolymer (R-PP) is featured by its relative content of isolated to block ethylene sequences (I(E)). According to the present invention the isolated to block ethylene sequences (I(E)) of the random propylene copolymer (R-PP) is measured on the xylene cold insoluble fraction (XCI) of the heterophasic propylene copolymer (RAHECO). Accordingly, the xylene cold insoluble fraction (XCI) of the heterophasic propylene copolymer (RAHECO) has an isolated to block ethylene sequences (I(E)) below 55%, like in the range of 40.0 to 53.0%, more preferably in the range of 42.0 to 50.0%, like 43.0 to 48.0%.

The I(E) content [%] is defined by in-equation (I)

$$I(E) = \frac{fPEP}{(fEEE + fPEE + fPEP)} \times 100 \qquad (I)$$

wherein

I(E) is the relative content of isolated to block ethylene sequences [in %];

fPEP is the mol fraction of propylene/ethylene/propylene sequences (PEP) in the xylene cold insoluble fraction (XCI) of the heterophasic propylene copolymer (RAHECO);

fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RAHECO);

fEEE is the mol fraction of ethylene/ethylene/ethylene sequences (EEE) in the xylene cold insoluble fraction (XCI) of the heterophasic propylene copolymer (RAHECO), wherein all sequence concentrations being based on a statistical triad analysis of $^{13}$C-NMR data.

The I(E) content is a value determined by the catalyst applied for the preparation of the heterophasic propylene copolymer (RAHECO) as well as the comonomer content of the xylene insoluble fraction (XCI). A low comonomer content leads to a higher I(E) content since the amount of propylene/ethylene/propylene sequences (PEP) in the xylene cold insoluble fraction (XCI) is statistically higher in case of a low overall amount of ethylene units.

Preferably, the heterophasic propylene copolymer (RAHECO) has a comonomer content of the xylene insoluble fraction (XCI) in the range of 4.0 to 15.0 mol.-%, more preferably in the range of 6.0 to 11.0 mol.-%, still more preferably in the range of 7.0 to 9.0 mol.-%.

The random propylene copolymer (R-PP) according to this invention has a melt flow rate $MFR_2$ (230° C./2.16 kg) before visbreaking measured according to ISO 1133 in the range of 1.0 to 4.0 g/10 min, more preferably in the range of 1.2 to 3.5 g/10 min, still more preferably in the range of 1.4 to 3.0 g/10 min.

The heterophasic propylene copolymer (RAHECO) preferably comprises 60.0 to 85.0 wt.-%, preferably 65.0 to 82.0 wt.-%, more preferably 70.0 to 80.0 wt.-% of the random propylene copolymer (R-PP), based on the total weight of the heterophasic propylene copolymer (RAHECO).

Additionally, the heterophasic propylene copolymer (RAHECO) preferably comprises 15 to 40 wt.-%, preferably 18.0 to 45.0 wt.-%, more preferably 20.0 to 40.0 wt.-% of the elastomeric propylene copolymer (E), based on the total weight of the heterophasic propylene copolymer (RAHECO).

Thus, it is appreciated that the heterophasic propylene copolymer (RAHECO) preferably comprises, more preferably consists of, 60.0 to 85.0 wt.-% of the random propylene copolymer (R-PP) and 15.0 to 40.0 wt.-% of the elastomeric propylene copolymer (E), based on the total weight of the heterophasic propylene copolymer (RAHECO).

Accordingly, a further component of the heterophasic propylene copolymer (RAHECO) is the elastomeric propylene copolymer (E) dispersed in the matrix (M). Concerning the comonomers used in the elastomeric propylene copolymer (E) it is referred to the information provided for the heterophasic propylene copolymer (RAHECO). Accordingly, the elastomeric propylene copolymer (E) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (E) comprises, especially consists of, monomers copolymerizable with propylene from the group consisting of ethylene, 1-butene and 1-hexene. More specifically, the elastomeric propylene copolymer (E) comprises—apart from propylene—units derivable from ethylene and/or 1-butene. Thus, in an especially preferred embodiment the elastomeric propylene copolymer (E) comprises units derivable from ethylene and propylene only.

The comonomer content, like ethylene content, of the elastomeric propylene copolymer (E) preferably is in the range of 30.0 to 65.0 mol-%, more preferably in the range of 55.0 to 62.0 mol-%, still more preferably in the range of 40.0 to 60.0 mol-%.

The heterophasic propylene copolymer (RAHECO) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

The heterophasic propylene copolymer (RAHECO) according to this invention is preferably produced in the presence of (a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

It is thus one requirement of the present invention that the heterophasic propylene copolymer (RAHECO) is free of phthalic acid esters as well as their respective decomposition products, i.e. phthalic acid esters, typically used as internal donor of Ziegler-Natta (ZN) catalysts. Preferably, the heterophasic propylene copolymer (RAHECO) is free of phthalic compounds as well as their respective decomposition products, i.e. phthalic compounds typically used as internal donor of Ziegler-Natta (ZN) catalysts.

The term "free of" phthalic acid esters, preferably phthalic compounds, in the meaning of the present invention refers to a heterophasic propylene copolymer (RAHECO) in which no phthalic acid esters as well no respective decomposition products, preferably no phthalic compounds as well as no respective decomposition products at all, are detectable.

As the heterophasic propylene copolymer (RAHECO) comprises the random propylene copolymer (R-PP) and the elastomeric propylene copolymer (E), the individual components are preferably also free of phthalic acid esters as well as their respective decomposition products, more preferably of phthalic compounds as well as their respective decomposition products.

The heterophasic propylene copolymer (RAHECO) comprises a matrix (M) being a random propylene copolymer (R-PP) and an elastomeric propylene copolymer (E) dispersed in said matrix (M). Preferably the random propylene copolymer (R-PP) comprises at least two polymer fractions, like two or three polymer fractions, all of them are propylene copolymers.

Even more preferred the random propylene copolymer (R-PP) comprises, preferably consists of, a first propylene copolymer fraction (R-PP1) and a second propylene copolymer fraction (R-PP2).

The random propylene copolymer (R-PP) has a melt flow rate $MFR_2$ (230° C./2.16 kg) before visbreaking in the range of 1.0 to 4.0 g/10 min, preferably in the range of 1.2 to 3.5 g/10 min, more preferably in the range of 1.4 to 3.0 g/10 min.

Preferably, the comonomer contents of the random propylene copolymer (R-PP) and the first propylene copolymer fraction (R-PP1) fulfil inequation (III), more preferably inequation (IIIa), still more preferably inequation (IIIb), $$\frac{Co(RPP)}{Co(RPP1)} \geq 2.0, \tag{III}$$

$$\frac{Co(RPP)}{Co(RPP1)} \geq 2.5, \tag{IIIa}$$

$$3.5 \geq \frac{Co(RPP)}{Co(RPP1)} \geq 3.0, \tag{IIIb}$$

wherein Co(RPP) is the comonomer content of the random propylene copolymer (R-PP) and Co(RPP1) is the comonomer content of the first propylene copolymer fraction (R-PP1).

Preferably, the first propylene copolymer fraction (R-PP1) and the second propylene copolymer fraction (R-PP2) differ in the comonomer content and/or in the melt flow rate $MFR_2$ (230° C./2.16 kg), more preferably differ in the comonomer content and in the melt flow rate $MFR_2$ (230° C./2.16 kg).

Preferably one of the propylene copolymer fractions (R-PP1) and (R-PP2) of the random propylene copolymer (R-PP) is the comonomer lean fraction and the other fraction is the comonomer rich fraction, wherein further the lean fraction and the rich fraction fulfil inequation (IV), more preferably inequation (IVa), still more preferably inequation (IVb), $$4.0 \leq \frac{Co(\text{rich})}{Co(\text{lean})} \leq 8.0, \tag{IV}$$

$$5.0 \leq \frac{Co(\text{rich})}{Co(\text{lean})} \leq 7.5, \tag{IVa}$$

$$5.5 \leq \frac{Co(\text{rich})}{Co(\text{lean})} \leq 7.0, \tag{IVb}$$

wherein Co (lean) is the comonomer content [wt.-%] of the random propylene copolymer fraction with the lower comonomer content and Co (rich) is the comonomer content of the random propylene copolymer fraction with the higher comonomer content.

Preferably, the first propylene copolymer fraction (R-PP1) is the random copolymer fraction with the lower comonomer content and the second propylene copolymer fraction (R-PP2) is the random copolymer fraction with the higher comonomer content.

Accordingly, it is preferred that the first propylene copolymer fraction (R-PP1) has a comonomer content in the range of 0.5 to 4.0 mol.-%, more preferably in the range of 1.0 to 3.5 mol.-%, still more preferably in the range of 1.5 to 3.0 mol.-% and/or that the second propylene copolymer fraction has a comonomer content in the range of 10.0 to 22.0 mol.-%, more preferably in the range of 12.5 to 20.0 mol.-%, still more preferably in the range of 15.0 to 19.5 mol.-%, based on the overall fractions (R-PP1) and (R-PP2), respectively.

In addition or alternatively to inequation (IV) one of the propylene copolymer fractions (R-PP1) and (R-PP2) of the random propylene copolymer (R-PP) is the low melt flow rate $MFR_2$ (230° C./2.16 kg) fraction and the other fraction is the high melt flow rate $MFR_2$ (230° C./2.16 kg) fraction, wherein further the low flow fraction and the high flow fraction fulfil inequation (V), more preferably inequation (Va), still more preferably inequation (Vb), $$\frac{MFR\text{(high)}}{MFR\text{(low)}} \geq 2.0, \qquad (V)$$

$$10.0 \geq \frac{MFR\text{(high)}}{MFR\text{(low)}} \geq 2.5, \qquad (Va)$$

$$8.0 \geq \frac{MFR\text{(high)}}{MFR\text{(low)}} \geq 3.0, \qquad (Vb)$$

wherein MFR (high) is the melt flow rate $MFR_2$ (230° C./2.16 kg) before visbreaking [g/10 min] of the random propylene copolymer fraction with the higher melt flow rate $MFR_2$ (230° C./2.16 kg) and MFR (low) is the melt flow rate $MFR_2$ (230° C./2.16 kg) before visbreaking [g/10 min] of the random propylene copolymer fraction with the lower melt flow rate $MFR_2$ (230° C./2.16 kg).

Preferably, the first propylene copolymer fraction (R-PP1) is the random copolymer fraction with the higher melt flow rate $MFR_2$ (230° C./2.16 kg) before visbreaking and the second propylene copolymer fraction (R-PP2) is the random copolymer fraction with the lower melt flow rate $MFR_2$ (230° C./2.16 kg) before visbreaking.

Accordingly, it is preferred that the first propylene copolymer fraction (R-PP1) has a melt flow rate $MFR_2$ (230° C./2.16 kg) before visbreaking in the range of 4.5 to 10.0 g/10 min, more preferably in the range of 4.8 to 8.0 g/10 min, still more preferably in the range of 5.0 to 7.0 g/10 min and/or that the second propylene copolymer fraction (R-PP2) has a melt flow rate $MFR_2$ (230° C./2.16 kg) before visbreaking in the range of 0.1 to 4.0 g/10 min, more preferably in the range of 0.5 to 2.0 g/10 min, still more preferably in the range of 0.7 to 1.5 g/10 min.

In one embodiment of the present invention, the heterophasic propylene copolymer (RAHECO) has been visbroken.

The visbroken heterophasic propylene copolymer (RAHECO) preferably has a higher melt flow rate than the non-visbroken heterophasic propylene copolymer (RAHECO).

Accordingly, the heterophasic propylene copolymer (RAHECO) before visbreaking preferably has a melt flow rate $MFR_2$ (230° C./2.16 kg) in the range of 0.5 to 3.5 g/10 min. For example, the melt flow rate (230° C./2.16 kg) of the heterophasic propylene copolymer (RAHECO) before visbreaking is from 0.8 to 3.0 g/10 min, like from 1.0 to 2.5 g/10 min.

Furthermore, the melt flow rate $MFR_2$ (230° C./2.16 kg) of the heterophasic propylene copolymer (RAHECO) after visbreaking is higher of 2.5 to 12.0 g/10 min, preferably in the range of 3.0 to 10.0 g/10 min, more preferably in the range of 3.5 to 8.0 g/10 min, like in the range of 3.5 to 7.0 g/10 min.

In one embodiment of the present invention, the heterophasic propylene copolymer (RAHECO) has been visbroken with a visbreaking ratio (VR) as defined by equation (II)

$$1.1 \leq \frac{MFRfinal - MFRinitial}{MFRinitial} \leq 10.0 \qquad (II)$$

wherein
"MFRfinal" is the $MFR_2$ (230° C./2.16 kg) of the heterophasic propylene copolymer (RAHECO) after visbreaking and
"MFRinitial" is the $MFR_2$ (230° C./2.16 kg) of the heterophasic propylene copolymer (RAHECO) before visbreaking. Said visbreaking ratio (VR) is preferably in the range of 1.1 to 5.0, more preferably in the range of 1.1 to 3.5.

Preferred mixing devices suited for visbreaking are discontinuous and continuous kneaders, twin screw extruders and single screw extruders with special mixing sections and co-kneaders.

By visbreaking the heterophasic propylene copolymer (RAHECO) with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of heterophasic propylene copolymer (RAHECO) to be subjected to visbreaking, the $MFR_2$ (230° C./2.16 kg) value of the heterophasic propylene copolymer (RAHECO) to be subjected to visbreaking and the desired target $MFR_2$ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of heterophasic propylene copolymer (RAHECO) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The inventive heterophasic propylene copolymer (RAHECO) is preferably obtained by visbreaking the heterophasic propylene copolymer (RAHECO), preferably visbreaking by the use of peroxide.

More precisely, the inventive heterophasic propylene copolymer (RAHECO) may be obtained by visbreaking the heterophasic propylene copolymer (RAHECO), preferably by the use of peroxide as mentioned above, in an extruder.

After visbreaking the heterophasic propylene copolymer (RAHECO) according to this invention is preferably in the form of pellets or granules. The instant heterophasic propylene copolymer (RAHECO) is preferably used in pellet or granule form for the preparation of the film.

The present invention is not only directed to the instant heterophasic propylene copolymer (RAHECO) but also to unoriented films made therefrom. Accordingly, in a further embodiment the present invention is directed to unoriented films, like cast films or blown films, e.g. air cooled blown films, comprising at least 70.0 wt.-%, preferably comprising at least 80.0 wt.-%, more preferably comprising at least 90.0 wt.-%, still more preferably comprising at least 95.0 wt.-%, yet more preferably comprising at least 99.0 wt.-%, of the instant heterophasic propylene copolymer (RAHECO).

One distinguishes between unoriented and oriented films (see for instance polypropylene handbook, Nello Pasquini, $2^{nd}$ edition, Hanser). Oriented films are typically monoaxially or biaxially oriented films, whereas unoriented films are cast or blown films. Accordingly, an unoriented film is not drawn intensively in machine and/or transverse direction as done by oriented films. Thus the unoriented film according to this invention is not a monoaxially or biaxially oriented film. Preferably the unoriented film according to the instant invention is a blown film or cast film.

In one specific embodiment the unoriented film is a cast film or an air-cooled blown film.

Preferably the unoriented film has a thickness of 10 to 1000 μm, more preferably of 20 to 700 μm, like of 40 to 500 μm.

The present invention is also directed to the use of the heterophasic propylene copolymer (RAHECO) in the manufacture of unoriented films, like cast films or blown films, e.g. air cooled blown films.

Further the present invention is directed to a sterilizable or sterilized film, like a sterilizable or sterilized unoriented film. More preferably the invention is directed to containers, i.e. pouches, especially to sterilizable or sterilized containers, i.e. pouches, comprising, preferably consisting of, the (unoriented) film as defined herein. The container is in particular a pouch. Further said container, i.e. pouch, has been preferably subjected to a sterilization treatment.

The present invention is also directed to cable insulations comprising the heterophasic propylene copolymer (RAHECO).

The instant heterophasic propylene copolymer (RAHECO) is preferably produced in a multistage process comprising at least two reactors connected in series a heterophasic propylene copolymer (RAHECO) comprising a matrix (M) being a random propylene copolymer (PP) and an elastomeric propylene copolymer (E) dispersed in said matrix (M).

Further, the weight ratio between the first propylene copolymer fraction (R-PP1) and second propylene copolymer fraction (R-PP2) preferably is 20:80 to 80:20, more preferably 25:75 to 75:25, still more preferably 40:60 to 60:40.

The heterophasic propylene copolymer (RAHECO) is obtained by a sequential polymerization process comprising the steps of a) polymerizing in a first reactor (R1) propylene and ethylene and/or a $C_4$ to $C_8$ α-olefin, obtaining a first random propylene copolymer fraction (R-PP1), b) transferring the first random propylene copolymer fraction (R-PP1) into a second reactor (R2), c) polymerizing in said second reactor (R2) in the presence of the first random propylene copolymer fraction (R-PP1) propylene and ethylene and/or a $C_4$ to $C_8$ α-olefin, obtaining a second random copolymer fraction (R-PP2), said first random propylene copolymer fraction (R-PP1) and said second random copolymer fraction (R-PP2) forming the random propylene copolymer (R-PP), d) transferring said random propylene copolymer (R-PP) into a third reactor (R3), e) polymerizing in said third reactor (R3) in the presence of the random propylene copolymer (R-PP) propylene and/or a $C_4$ to $C_8$ α-olefin, obtaining a third polymer fraction, said polymer fraction is the elastomeric copolymer (E), said propylene copolymer (R-PP) and said elastomeric propylene copolymer (E) form the heterophasic propylene copolymer (RAHECO).

For preferred embodiments of the heterophasic propylene copolymer (HECO), the random propylene copolymer (R-PP), the first propylene copolymer fraction (R-PP1), the second propylene copolymer fraction (R-PP2), and the elastomeric copolymer (E) reference is made to the definitions given above.

The term "sequential polymerization process" indicates that the heterophasic propylene copolymer (HECO) is produced in at least two, like three, reactors connected in series. Accordingly, the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor (R3) are gas phase reactors (GPR). Accordingly, for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol process of Basell.

Preferably, in the instant process for producing the heterophasic propylene copolymer (RAHECO) as defined above the conditions for the first reactor, i.e. the slurry reactor, like a loop reactor, may be as follows:

the temperature is within the range of 50° C. to 110° C., preferably between 60° C. and 100° C., more preferably between 68° C. and 95° C., the pressure is within the range of 20 bar to 80 bar, preferably between 40 bar to 70 bar, hydrogen can be added for controlling the molar mass in a manner known per se.

Subsequently, the reaction mixture of the first reactor is transferred to the second reactor, i.e. gas phase reactor, where the conditions are preferably as follows:

the temperature is within the range of 50° C. to 130° C., preferably between 60° C. and 100° C., the pressure is within the range of 5 bar to 50 bar, preferably between 15 bar to bar, hydrogen can be added for controlling the molar mass in a manner known per se.

The condition in the third reactor is similar to the second reactor.

The residence time can vary in the three reactor zones.

In one embodiment of the process for producing the heterophasic propylene copolymer (RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) is obtained by a multistage polymerization process, as described above, in the presence of a catalyst system.

As pointed out above in the specific process for the preparation of the heterophasic propylene copolymer (RAHECO) as defined above, a specific Ziegler-Natta catalyst (ZN-C) must be used. Accordingly, the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C) can be further defined by the way as obtained. Accordingly, the Ziegler-Natta catalyst (ZN-C) is preferably obtained by a process comprising the steps of a)

$a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP 2 415 790, EP 2 610 270, EP 2 610 271 and EP 2 610 272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

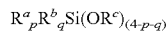

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)₂Si(OCH₃)₂, (cyclohexyl)(methyl)Si(OCH₃)², (phenyl)₂Si(OCH₃)₂ and (cyclopentyl)₂Si(OCH₃)₂, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor), the latter especially preferred. In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH₃, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 450, still more preferably is in the range of 120 to 350.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the second propylene copolymer fraction (R-PP2):

$$\frac{C(PP) - w(PP1) \times C(PP1)}{w(PP2)} = C(PP2) \qquad (I)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
C(PP1) is the comonomer content [in mol-%] of the first propylene copolymer fraction (R-PP1),
C(PP) is the comonomer content [in mol-%] of the random propylene copolymer (R-PP),
C(PP2) is the calculated comonomer content [in mol-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \qquad (II)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
XS(PP1) is the xylene cold soluble (XCS) content [in wt.-%] of the first propylene copolymer fraction (R-PP1),
XS(PP) is the xylene cold soluble (XCS) content [in wt.-%] of the random propylene copolymer (R-PP),
XS(PP2) is the calculated xylene cold soluble (XCS) content [in wt.-%] of the second propylene copolymer fraction (R-PP2), respectively.

Calculation of melt flow rate MFR₂ (230° C./2.16 kg) of the second propylene copolymer fraction (R-PP2):

$$MFR(PP2) = 10^{\left[\frac{\log(MFR(PP)) - w(PP1) \times \log(MFR(PP1))}{w(PP2)}\right]} \qquad (III)$$

wherein w(PP1) is the weight fraction [in wt.-%] of the first propylene copolymer fraction (R-PP1), w(PP2) is the weight fraction [in wt.-%] of second propylene copolymer fraction (R-PP2), MFR(PP1) is the melt flow rate MFR$_2$ (230° C./2.16 kg) [in g/10 min] of the first propylene copolymer fraction (R-PP1), MFR(PP) is the melt flow rate MFR$_2$ (230° C./2.16 kg) [in g/10 min] of the random propylene copolymer (R-PP), MFR(PP2) is the calculated melt flow rate MFR$_2$ (230° C./2.16 kg) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad (IV)$$

wherein w(PP) is the weight fraction [in wt. %] of the random propylene copolymer (R-PP), i.e. polymer produced in the first and second reactor (R1+R2), w(E) is the weight fraction [in wt. %] of the elastomeric propylene copolymer (E), i.e. polymer produced in the third reactor (R3)

C(PP) is the comonomer content [in mol-%] of the random propylene copolymer (R-PP), i.e. comonomer content [in mol-%] of the polymer produced in the first and second reactor (R1+R2), C(RAHECO) is the comonomer content [in mol-%] of the propylene copolymer, i.e. is the comonomer content [in mol-%] of the polymer obtained after polymerization in the third reactor (R3), C(E) is the calculated comonomer content [in mol-%] of elastomeric propylene copolymer (E), i.e. of the polymer produced in the third reactor (R3).

MFR$_2$ (230° C./2.16 kg) is measured according to ISO 1133 at 230° C. and 2.16 kg load.

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}] = 100 * fE$$

The weight percent comonomer incorporation was calculated from the mole fraction:

$$E[\text{wt \%}] = 100 * (fE * 28.06) / ((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \qquad (I)$$

wherein

I(E) is the relative content of isolated to block ethylene sequences [in %];

fPEP is the mol fraction of propylene/ethylene/propylene sequences (PEP) in the sample;

fPEE is the mol fraction of propylene/ethylene/ethylene sequences (PEE) and of ethylene/ethylene/propylene sequences (EEP) in the sample;

fEEE is the mol fraction of ethylene/ethylene/ethylene sequences (EEE) in the sample.

Intrinsic viscosity is measured according to DIN ISO 1628/1, October 1999 (in Decalin at 135° C.).

The xylene cold solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

The hexane extractable fraction is determined according to the European Pharmacopeia 6.0 EP613. Test bar specimens of 80×10×4 mm³ injection molded at 23° C. in line with EN ISO 1873-2 were used in an amount of 10 g, and the extraction was performed in 100 ml n-hexane by boiling under reflux for 4 h, followed by cooling in ice water for 45 min. The resulting solution is filtered under vacuum in less than 5 min, followed by evaporation under nitrogen stream. After drying the evaporation residue it is weighed and the hexane extractable fraction calculated.

Melting temperature ($T_m$) crystallization temperature ($T_c$) and heat of crystallization ($H_c$): measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. The crystallization temperature is determined from the cooling step, while the melting temperature is determined from the second heating step.

Transparency, haze and clarity were determined according to ASTM D1003-00 on 60×60×1 mm³ plaques injection molded in line with EN ISO 1873-2 using a melt temperature of 200° C. and on cast films of 50 µm thickness produced on a monolayer cast film line with a melt temperature of 220° C. and a chill roll temperature of 20° C.

Flexural Modulus: The flexural modulus was determined in 3-point-bending according to ISO 178 on 80×10×4 mm³ test bars injection molded at 23° C. in line with EN ISO 1873-2.

Charpy notched impact strength is determined according to ISO 179 1eA at 23°, and at −20° C. by using an 80×10×4 mm³ test bars injection molded in line with EN ISO 1873-2. Tensile modulus in machine and transverse direction was determined according to ISO 527-3 at 23° C. on cast films of 50 µm thickness produced on a monolayer cast film line with a melt temperature of 220° C. and a chill roll temperature of 20° C. Testing was performed at a cross head speed of 1 mm/min.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

2. Examples

The catalyst used in the polymerization processes for the heterophasic propylene copolymers (RAHECO) of the inventive examples (IE) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol-(DOWANOL™ PnB), provided by Dow bis(2-ethylhexyl)citraconate, provided by SynphaBase $TiCl_4$ provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and dicyclopentyl dimethoxy silane (D-Donor) as donor.

The aluminium to donor ratio, the aluminium to titanium ratio and the polymerization conditions are indicated in table 1.

TABLE 1

| Polymerization conditions | | CE 1 | IE 1 | CE 3 | CE 4 | IE 2 | CE 2 |
|---|---|---|---|---|---|---|---|
| Prepolymerization | | | | | | | |
| TEAL/Ti | [mol/mol] | 200 | 201 | 199 | 196 | 193 | 177 |
| TEAL/donor | [mol/mol] | 7.69 | 7.90 | 7.87 | 7.87 | 8.53 | 7.87 |
| Temperature | [° C.] | 30 | 30 | 30 | 30 | 30 | 30 |
| C2 feed | [kg/h] | 0.24 | 0.21 | 0.22 | 0.23 | 0.25 | 0.25 |
| res. time | [h] | 0.33 | 0.33 | 0.33 | 0.33 | 0.33 | 0.35 |
| Loop | | | | | | | |
| Temperature | [° C.] | 70 | 70 | 70 | 70 | 70 | 70 |
| Split | [%] | 30.8 | 30.8 | 30.8 | 30.8 | 30.8 | 30.3 |
| H2/C3 ratio | [mol/kmol] | 1.15 | 1.15 | 1.15 | 1.15 | 0.93 | 1.30 |
| C2/C3 ratio | [mol/kmol] | 3.86 | 3.77 | 3.78 | 3.84 | 4.11 | 4.44 |
| $MFR_2$ (R-PP1) | [g/10 min] | 6.0 | 6.0 | 6.1 | 6.4 | 5.2 | 4.9 |
| XCS | [wt.-%] | 5.6 | 5.3 | 6.0 | 4.2 | 5.4 | 4.4 |
| C2 content (R-PP1) | [mol-%] | 3.2 | 3.0 | 3.0 | 2.7 | 3.0 | 2.8 |
| GPR 1 | | | | | | | |
| Temperature | [° C.] | 80 | 80 | 80 | 80 | 80 | 80 |
| Pressure | [kPa] | 2700 | 2700 | 2700 | 2700 | 2700 | 2700 |
| Split | [%] | 46.2 | 46.2 | 46.2 | 46.2 | 46.2 | 60 |
| H2/C3 ratio | [mol/kmol] | 2.7 | 2.6 | 2.8 | 3.0 | 2.6 | 4.0 |
| C2/C3 ratio | [mol/kmol] | 46.6 | 46.7 | 46.9 | 49.6 | 46.8 | 45.5 |
| $MFR_2$ (R-PP) | [g/10 min] | 1.9 | 2.2 | 1.4 | 2.0 | 1.7 | 1.7 |
| $MFR_2$ (R-PP2) | [g/10 min] | 0.85 | 1.1 | 0.55 | 0.88 | 0.80 | 0.87 |
| XCS | [wt.-%] | 18.6 | 17.9 | 18.1 | 22.5 | 21.0 | 16.1 |
| C2 content (R-PP) | [mol-%] | 9.4 | 8.7 | 9.2 | 9.6 | 9.7 | 8.6 |
| C2 content (R-PP2) | [mol-%] | 18.3 | 17.0 | 18.0 | 19.3 | 19.3 | 16.9 |
| GPR 2 | | | | | | | |
| Temperature | [° C.] | 70 | 71 | 72 | 74 | 72 | 75 |
| Pressure | [kPa] | 2600 | 2600 | 2600 | 2600 | 2600 | 2600 |
| Split | [%] | 23.0 | 23.0 | 23.0 | 23.0 | 23.0 | 24.2 |
| C2/C3 ratio | [mol/kmol] | 205 | 252 | 302 | 317 | 311 | 276 |
| H2/C2 ratio | [mol/kmol] | 82 | 84 | 79 | 94 | 195 | 88 |
| $MFR_2$ | [g/10 min] | 1.2 | 1.2 | 1.1 | 1.1 | 1.3 | 1.1 |
| XCS | [wt.-%] | 34.9 | 37.0 | 37.8 | 39.5 | 39.0 | 34.4 |
| C2 content (total) | [mol-%] | 15.0 | 18.4 | 19.5 | 20.4 | 20.7 | 15.2 |
| C2 content (EPR) | [mol-%] | 34.5 | 51.0 | 53.0 | 56.0 | 56.0 | 36.5 |

C2 ethylene
H2/C3 ratio hydrogen/propylene ratio
C2/C3 ratio ethylene/propylene ratio
½ GPR ½ gas phase reactor
Loop Loop reactor
$MFR_2$ MFR (230° C./2.16 kg)

The inventive and comparative heterophasic propylene copolymers (RAHECOs) (based on the $3^{rd}$ reactor product from Table 1) have been visbroken by using a co-rotating twin-screw extruder at 200-230° C. and using an appropriate amount of (tert.-butylperoxy)-2,5-dimethylhexane (Trigonox 101, distributed by Akzo Nobel, Netherlands) to achieve the target $MFR_2$ as mentioned in table 1. All products were stabilized with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.1 wt.-% calcium stearate.

TABLE 2

| Properties after visbreaking | | CE1 | IE1 | CE3 | CE4 | IE2 | CE2 |
|---|---|---|---|---|---|---|---|
| $MFR_2$ | [g/10 min] | 4.0 | 4.1 | 3.9 | 3.8 | 4.4 | 4.0 |
| VR | [—] | 2.6 | 2.8 | 2.7 | 2.3 | 2.4 | 2.9 |
| C2 (total) | [mol-%] | 14.34 | 17.61 | 18.39 | 19.13 | 19.57 | 14.88 |
| XCS | [wt.-%] | 37.0 | 41.0 | 40.0 | 42.0 | 42.8 | 36.0 |
| C2 (XCS) | [mol-%] | 30.2 | 34.2 | 36.5 | 36.8 | 32.6 | 31.8 |
| IV (XCS) | [dl/g] | 2.28 | 2.12 | 2.13 | 2.17 | 2.16 | 2.10 |
| C2 (XCI) | [mol-%] | 6.6 | 7.9 | 8.4 | 9.0 | 8.6 | 7.0 |
| C6 solubles | [wt.-%] | 2.2 | 2.7 | 2.5 | 3.0 | 3.9 | 2.4 |
| Tc | [° C.] | 114 | 116 | 114 | 114 | 114 | 117 |
| Tm | [° C.] | 148 | 150 | 148 | 148 | 149 | 148 |
| NIS @23° C. (IM) | [$kJ/m^2$] | 77.0 | 74.6 | 75.6 | 74.1 | 76.9 | 77.0 |
| NIS @–20° C. (IM) | [$kJ/m^2$] | 1.69 | 3.49 | 4.71 | 4.54 | 4.34 | 1.93 |
| FM (IM) | [MPa] | 366 | 338 | 345 | 325 | 318 | 389 |

TABLE 2-continued

Properties after visbreaking

|  |  | CE1 | IE1 | CE3 | CE4 | IE2 | CE2 |
|---|---|---|---|---|---|---|---|
| Haze (IM) | [%] | 63.1 | 76.5 | 81.4 | 76.2 | 57.1 | 56.5 |
| Haze b.s. (film) | [%] | 5.69 | 10.11 | 16.78 | 13.78 | 6.08 | 5.57 |
| Haze a.s. (film) | [%] | 11.02 | 15.03 | 21.02 | 17.35 | 10.80 | 9.60 |
| TM MD (film) | [MPa] | 237 | 219 | 223 | 213 | 212 | 249 |
| TM TD (film) | [MPa] | 214 | 184 | 185 | 174 | 163 | 214 |

VR visbreaking ratio
C2 ethylene
FM flexural modulus
IM injection molded
b.s. before sterilization
a.s. after sterilization
TM tensile modulus
MD machine direction
TD transversal direction

TABLE 3

Relative content of isolated to block
ethylene sequences (I(E)) of the XCI fraction

|  |  | CE1 | IE1 | CE3 | CE4 | IE2 | CE2 |
|---|---|---|---|---|---|---|---|
| I(E)[1] | [%] | 57 | 45 | 45 | 46 | 47 | 59 |
| fEEE | [mol-%] | 1.45 | 3.22 | 2.93 | 3.07 | 3.05 | 1.52 |
| fEEP | [mol-%] | 1.84 | 1.56 | 2.04 | 1.89 | 1.68 | 1.49 |
| fPEP | [mol-%] | 4.30 | 3.94 | 4.13 | 4.24 | 4.22 | 4.34 |

[1] $I(E) = \dfrac{fPEP}{(fEEE + fPEE + fPEP)} \times 100$

As can be gathered from Table 2, the inventive examples show an optimized or improved balance between optical and mechanical properties, i.e. an improved optical performance at comparable stiffness (resp. softness) level. Further, the excellent optical properties of a film comprising the heterophasic propylene copolymer according to the inventive examples are maintained after sterilization.

What is claimed is:

1. A heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M),
   wherein the heterophasic propylene copolymer (RA-HECO) has
   a) a melt flow rate $MFR_2$ (230° C./2.16 kg) measured according to ISO 1133 in the range of 2.5 to 12.0 g/10 min,
   b) a xylene cold soluble fraction (XCS) determined according ISO 16152 (25° C.) in the range of 38.0 to 50.0 wt.-%, said xylene cold soluble fraction (XCS) having a comonomer content below 36.0 mol-%,
   and wherein further
   the xylene cold insoluble fraction (XCI) of the heterophasic propylene copolymer (RAHECO) has a relative content of isolated to block ethylene sequences (I(E)) of below 55.0%, wherein the I(E) content is defined by equation (I)

$$I(E) = \frac{fPEP}{(fEEE + fPEE + fPEP)} \times 100 \quad \text{(I)}$$

wherein
I(E) is the relative content of isolated to block ethylene sequences [in %];
fPEP is the mol fraction of propylene/ethylene/propylene sequences (PEP) in the xylene cold insoluble fraction (XCI) of the heterophasic propylene copolymer (RA-HECO);
fPEE is the mol fraction of propylene/ethylene/ethylene sequences (PEE) and of ethylene/ethylene/propylene sequences (EEP) in the xylene cold insoluble fraction (XCI) of the heterophasic propylene copolymer (RA-HECO); and
fEEE is the mol fraction of ethylene/ethylene/ethylene sequences (EEE) in the xylene cold insoluble fraction (XCI) of the heterophasic propylene copolymer (RA-HECO),
wherein all sequence concentrations being based on a statistical triad analysis of $^{13}$C-NMR data.

2. The heterophasic propylene copolymer (RAHECO) according to claim 1, wherein the heterophasic propylene copolymer (RAHECO) is free of phthalic acid esters and their respective decomposition products.

3. The heterophasic propylene copolymer (RAHECO) according to claim 1, wherein the xylene cold soluble fraction (XCS) has an intrinsic viscosity (IV) determined according to DIN ISO 162/1 (in Decalin at 135° C.) in the range of 1.8 to 3.5 dl/g.

4. The heterophasic propylene copolymer (RAHECO) according to claim 1, wherein the random propylene copolymer (R-PP) has at least one of:
   i) before vis-breaking a melt flow rate $MFR_2$ (230° C./2.16 kg) measured according to ISO 1133 in the range of 1.0 to 4.0 g/10 min, or
   ii) a comonomer content in the range of 5.1 to 17.0 mol-%.

5. The heterophasic propylene copolymer (RAHECO) according to claim 1, wherein the random propylene copolymer (R-PP) comprises a first propylene copolymer fraction (R-PP1) and a second propylene copolymer fraction (R-PP2) and the comonomer contents of the random propylene copolymer (R-PP) and the first propylene copolymer fraction (R-PP1) fulfil inequation (III), $$\frac{Co(RPP)}{Co(RPP1)} \geq 2.0, \quad \text{(III)}$$

wherein Co(RPP) is the comonomer content of the random propylene copolymer (R-PP) and Co(RPP1) is the comonomer content of the first propylene copolymer fraction (R-PP1).

6. The heterophasic propylene copolymer (RAHECO) according to claim 1, wherein the heterophasic propylene copolymer (RAHECO) comprises 60.0 to 85.0 wt.-%, based on the total weight of the heterophasic propylene copolymer (RAHECO), of the random propylene copolymer (R-PP) and 15.0 to 40.0 wt.-%, based on the total weight of the heterophasic propylene copolymer (RAHECO), of the elastomeric propylene copolymer (E).

7. The heterophasic propylene copolymer (RAHECO) according to claim 1, wherein the comonomers of at least one of: the random propylene copolymer (R-PP) or the elastomeric propylene copolymer (E) are at least one of: ethylene or $C_4$ to $C_8$ α-olefins.

8. The heterophasic propylene copolymer (RAHECO) according to claim 1, wherein the heterophasic propylene copolymer (RAHECO) has been visbroken.

9. The heterophasic propylene copolymer (RAHECO) according to claim 8, wherein the heterophasic propylene copolymer (RAHECO) has been visbroken with a visbreaking ratio (VR) as defined by in-equation (II)

$$1.1 \le \frac{MFRfinal - MFRinitial}{MFRinitial} \le 10.0 \quad (II)$$

wherein
"MFRfinal" is the $MFR_2$ (230° C./2.16 kg) of the heterophasic propylene copolymer (RAHECO) after visbreaking and
"MFRinitial" is the $MFR_2$ (230° C./2.16 kg) of the heterophasic propylene copolymer (RAHECO) before visbreaking.

10. The heterophasic propylene copolymer (RAHECO) according to claim 1, wherein the heterophasic propylene copolymer (RAHECO) has a flexural modulus measured according to ISO 178 on injection molded specimen below 500 MPa.

11. The heterophasic propylene copolymer (RAHECO) according to claim 1, wherein the heterophasic propylene copolymer (RAHECO) has at least one of:
i) a haze according to ASTM D 1003-00 measured on a 1 mm thick injection molded specimen below 80.0%, preferably below 78%, or
ii) a haze before sterilization determined according to ASTM D 1003-00 measured on a 50 μm cast film of below 15.0%, preferably of below 12.0%, or
iii) a haze after sterilization determined according to ASTM D 1003-00 measured on a 50 μm cast film of below 20.0%, preferably of below 16.0%.

12. The heterophasic propylene copolymer (RAHECO) according to claim 1, wherein the heterophasic propylene copolymer (RAHECO) has a melting temperature Tm of at least 140° C.

13. A polymerization process for producing the heterophasic propylene copolymer (RAHECO) according to claim 1, comprising the steps of
a) polymerizing in a first reactor (R1) propylene and at least one of: ethylene or a $C_4$ to $C_8$ α-olefin, obtaining a first random propylene copolymer fraction (R-PP1),
b) transferring the first random propylene copolymer fraction (R-PP1) into a second reactor (R2),
c) polymerizing in said second reactor (R2) in the presence of the first random propylene copolymer fraction (R-PP1) propylene and at least one of: ethylene or a $C_4$ to $C_8$ α-olefin, obtaining a second random copolymer fraction (R-PP2), said first random propylene copolymer fraction (R-PP1) and said second random copolymer fraction (R-PP2) forming the random propylene copolymer (R-PP),
d) transferring said random propylene copolymer (R-PP) into a third reactor (R3), and
e) polymerizing in said third reactor (R3) in the presence of at least one of: the random propylene copolymer (R-PP) propylene or a $C_4$ to $C_8$ α-olefin, obtaining a third polymer fraction, said polymer fraction is the elastomeric copolymer (E), said propylene copolymer (R-PP) and said elastomeric propylene copolymer (E) form the heterophasic propylene copolymer (RAHECO).

14. The process according to claim 13, wherein the first random propylene copolymer fraction (R-PP1), the random propylene copolymer (R-PP) and the elastomeric copolymer (E) have been polymerized in the presence of
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non phthalic acid ester;
b) optionally a co-catalyst (Co), and
c) optionally an external donor (ED).

15. The process according to claim 13, wherein
a) the internal donor (ID) is selected from optionally substituted malonates, maleates, succinates, glutarates, cyclohexene-1,2-dicarboxylates, benzoates, derivatives thereof, and mixtures thereof, preferably the internal donor (ID) is a citraconate;
b) the molar-ratio of co-catalyst (Co) to external donor (ED) [Co/ED] is 5 to 45.

16. A film, comprising the heterophasic propylene copolymer (RAHECO) according to claim 1.

17. A cable insulation, comprising the heterophasic propylene copolymer (RAHECO) according to claim 1.

* * * * *